United States Patent [19]

Sparks

[11] 4,146,051

[45] Mar. 27, 1979

[54] FLUID FLOW CONTROL SYSTEM

[75] Inventor: Brian E. Sparks, Weare Giffard, England

[73] Assignee: Lucas Industries Limited, Birmingham, England

[21] Appl. No.: 889,424

[22] Filed: Mar. 23, 1978

Related U.S. Application Data

[63] Continuation of Ser. No. 744,811, Nov. 24, 1976, abandoned.

[30] Foreign Application Priority Data

Jan. 10, 1976 [GB] United Kingdom ............... 925/76

[51] Int. Cl.² .......................................... G05D 7/06
[52] U.S. Cl. ................................. 137/486; 137/487.5
[58] Field of Search ................... 137/487.5, 487, 486; 251/131

[56] References Cited

U.S. PATENT DOCUMENTS

| 3,464,438 | 9/1969 | Maurer | 137/487.5 |
| 3,875,955 | 4/1975 | Gallatin | 137/487 X |
| 3,930,518 | 1/1976 | Fuller | 137/487.5 X |

FOREIGN PATENT DOCUMENTS 1197897  7/1970  United Kingdom ................ 137/487.5

Primary Examiner—Alan Cohan

[57] ABSTRACT

A gas flow control system has a variable metering device, a circuit for generating a first electrical signal which is a function of a desired gas flow through the metering device, a circuit for generating a second electrical signal which is a function of the gas pressure upstream of the metering device, and control means, responsive to the first and second electrical signals, for varying the effective flow area of the metering device.

6 Claims, 5 Drawing Figures

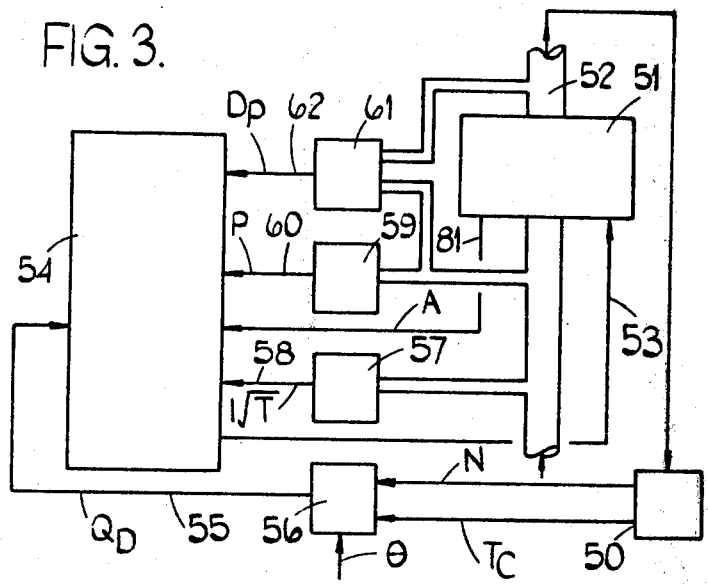
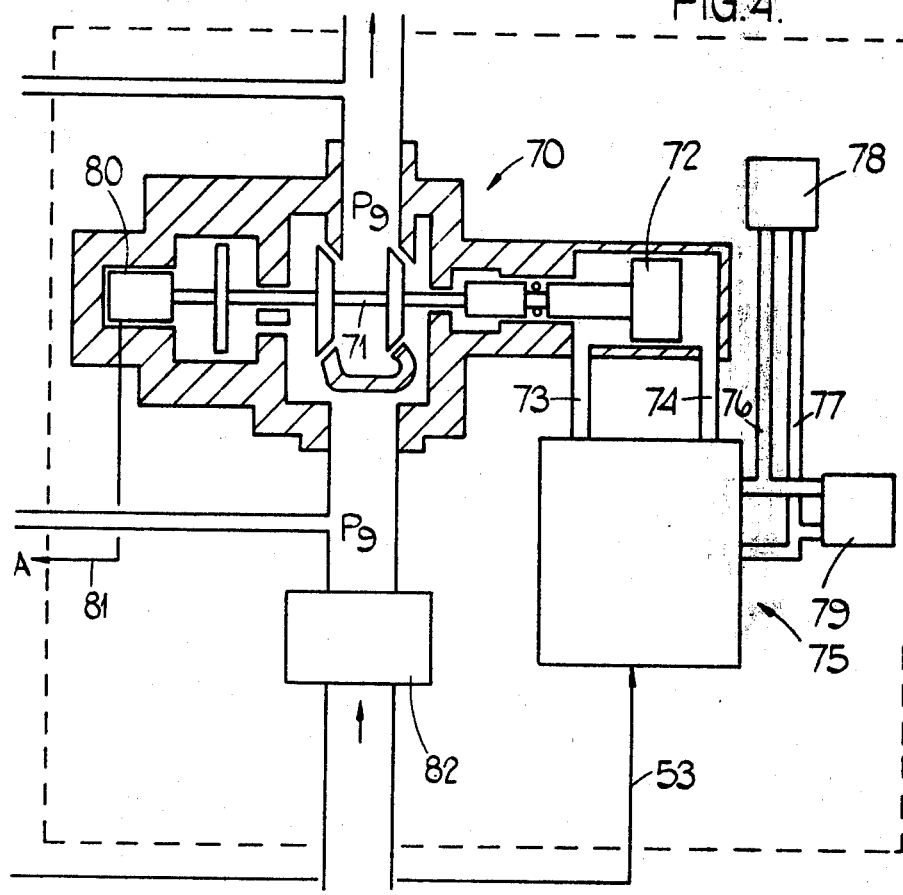

FLUID FLOW CONTROL SYSTEM

This is a continuation of application Ser. No. 744,811, filed Nov. 24, 1976 now abandoned.

This invention relates to flow control systems for gases, and in particular to such systems when intended for control of a fuel gas supply to a gas turbine engine.

In gas flow control systems operating on choked flow in which control is effected by means of a variable orifice, it is known to maintain the pressure upstream of this orifice substantially constant, in order that flow shall be proportional to the effective area of the metering orifice. In flow control systems for gases, moreover, it is known to regulate the aforesaid upstream pressure by providing a pressure reducing device upstream of the metering orifice.

The present invention relates to a gas flow control system in which the requirement for a separate pressure control device is avoided.

According to the invention a gas flow control system comprises a variable flow metering device, means for generating a first signal proportional to a desired gas flow through said device, means for generating a second signal proportional to the gas pressure upstream of said device, means responsive to said first and second signals for varying the effective flow area of said metering device.

Figure 1:
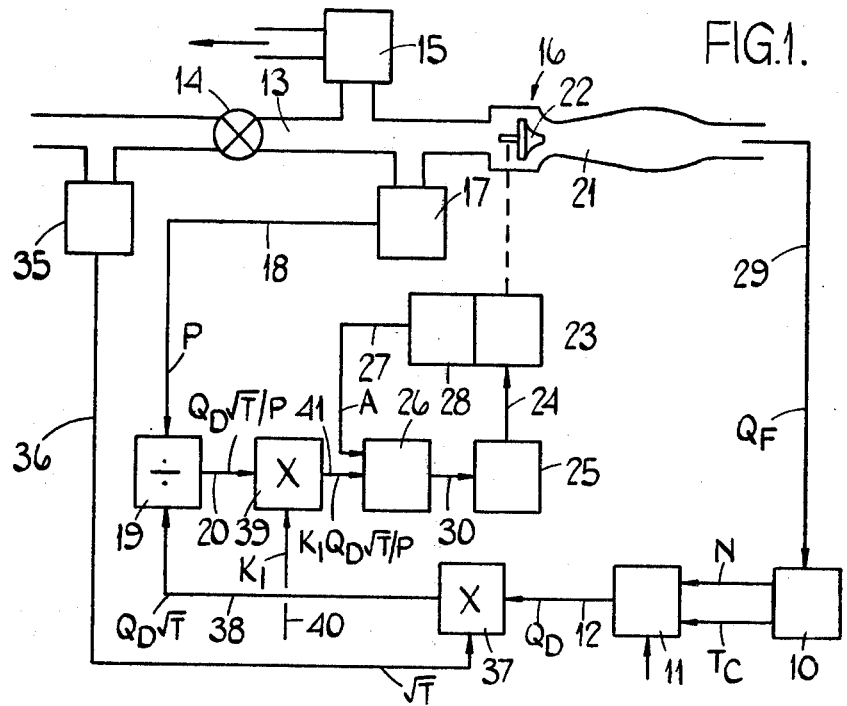
Figure 2:
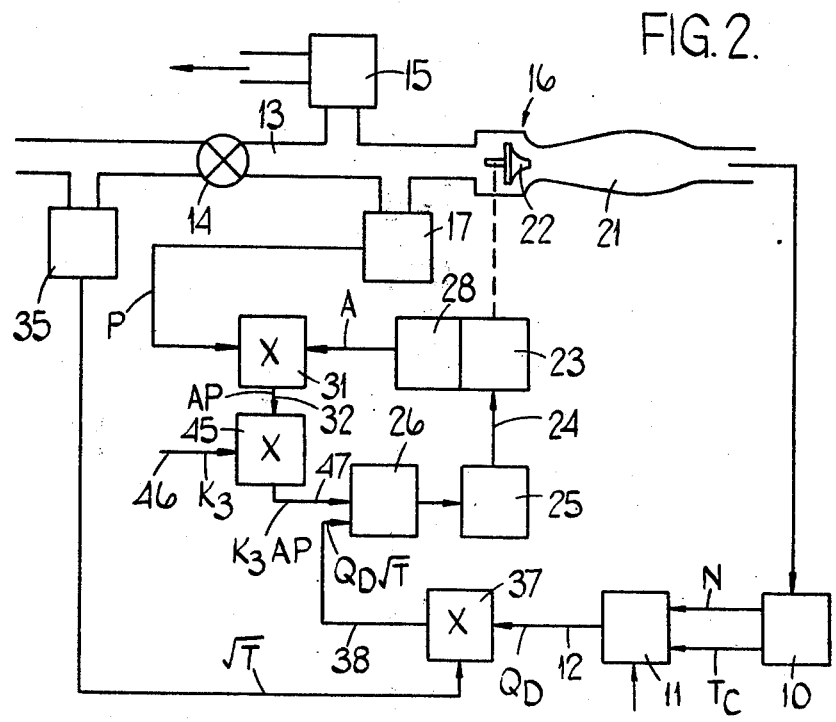
Figure 5:
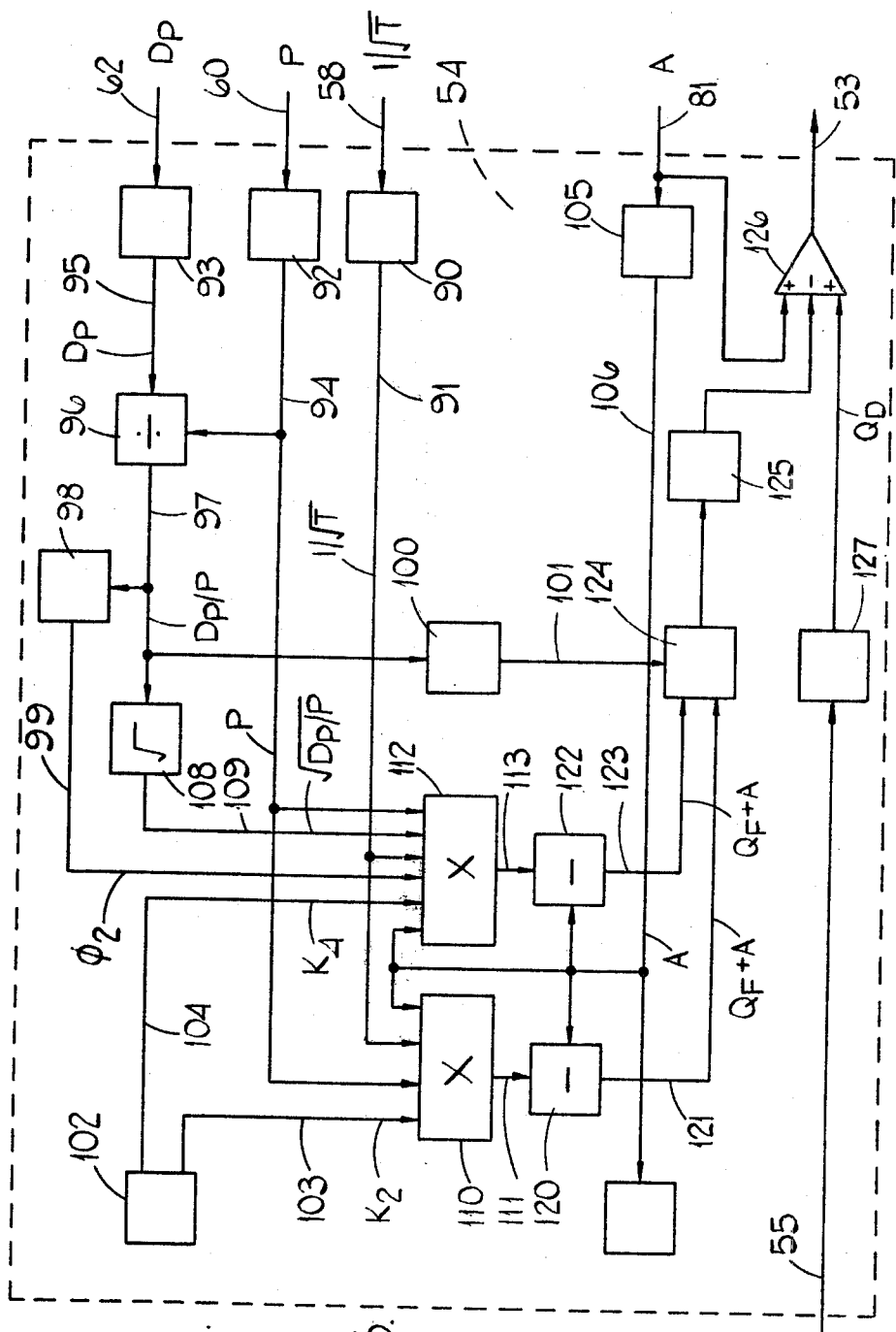

Embodiments of the invention will now be described, by way of example only and with reference to the accompanying drawings, in which:

FIG. 1 shows, diagrammatically, a system for controlling flow of fuel gas to a gas turbine engine, and intended for use with choked gas flow through a metering orifice, FIG. 2 shows an alternative system for choked gas flow, FIG. 3 is a block diagram of a system adapted to deal with both choked and unchoked gas flows, FIG. 4 shows diagrammatically, a metering valve forming part of the system of FIG. 3, and FIG. 5 is a block diagram of the electrical control circuit of FIG. 3.

As shown in FIG. 1 a gas turbine engine 10 has an associated electrical control circuit 11 which is responsive to engine operating parameters, for example engine speed N and combustion temperature $T_C$. Circuit 11 is also responsive to a signal $\theta$ dependent on the setting of a power demand control for the engine 10, and provides, on a line 12, a signal $Q_D$ which is proportional to the required engine fuel demand.

A fuel gas supply conduit 13 is provided with a shut-off cock 14 and pressure-operated vent valve 15. In series between the conduit 13 and the engine 10 is a variable flow metering valve 16, which will later be described in more detail.

A pressure transducer 17 is responsive to the gas pressure P at the inlet of valve 16 to generate, on a line 18, an electrical signal which is proportional to this inlet pressure. A temperature-responsive circuit 35 is responsive to the temperature T of the gas upstream of the shut-off cock 14. The circuit 35 provides a signal proportional to $\sqrt{T}$ on a line 36 to a multiplying circuit 37, which is also responsive to the signal $Q_D$ on line 12, to provide a signal proportional to $Q_D \sqrt{T}$ on a line 38. A dividing circuit 19 responsive to the signals $Q_D \sqrt{T}$ and P on lines 38, 18 respectively to supply, on a line 20, a valve position demand signal $Q_D \sqrt{T}/P$.

The valve 16 comprises a passage which is generally in the shape of a venturi 21 and a control element 22 which is movable by a motor 23 towards and away from the throat of the venturi 21 to vary the throat area thereof. Motor 23 is conveniently a stepper motor, so that the control element 22 may be positioned accurately in accordance with the signals on a line 24 from a motor control circuit 25. The combination of the venturi 21 and control element 22 provides that the mass flow $Q_F$ of gas through the valve 16 is proportional to the effective flow area A of the valve and also to the pressure P upstream of the valve 16, provided that the pressure difference across valve 16 is sufficient to raise the gas velocity through the throat of valve 16 to the local speed of sound, that is the gas flow is "choked." The provision of the venturi 21 ensures that gas flow through the valve 16 can reach this speed at relatively low pressure differences across valve 16. A further multiplying circuit 39 is supplied with the $Q_D \sqrt{T}/P$ signal on line 20, and is also supplied with an adjusting signal $K_1$ on a line 40, to supply, on a line 41, a signal proportional to $K_1 Q_D \sqrt{T}/P$.

A comparator circuit 26 is responsive to the signal on line 41 and also to a position signal on a line 27, this position signal being generated by a transducer 28 responsive to the position A of the control element 22. Comparator circuit 26 generates, on a line 30, a valve position error signal to which the motor control circuit 25 is responsive, there being no signal on line 30 in steady-state conditions.

The control element 22 of valve 16 is positioned in accordance with the valve position demand signal, whereby $A = K_1 Q_D \sqrt{T}/P$. Moreover, since $Q_F = K_2 \cdot AP/\sqrt{T}$, where $K_2$ is a function of the characteristics of the gas.

From which: $Q_F = K_1 \cdot K_2 \, Q_D$.

The signal $K_1$ on line 40 can be adjusted so that $K_1 \cdot K_2$ is unity, whereby actual fuel mass flow is equal to demanded flow.

The alternative embodiment shown in FIG. 2 is also suitable for choked gas flow and is generally similar to that shown in FIG. 1, identical parts having corresponding numbers. The arrangement shown in FIG. 2 does not, however, include a dividing circuit 19, but has instead a multiplying circuit 31 which is responsive to signals from the transducers 17 and 28 of generate, on a line 32 a signal proportional to A.P. A further multiplying circuit 45 is responsive to the signal on line 32 and also to an adjusting signal $K_3$ on a line 46 to supply, on a line 47, a signal proportional to $K_3$ AP. Comparator circuit 26 is responsive to the $Q_D \sqrt{T}$ and $K_3$ AP signals on lines 38, 47 respectively to generate a valve position error signal such that in equilibrium: $Q_D \sqrt{T} = K_3 AP$ Moreover since, as before, $Q_F = K_2 \, AP/\sqrt{T}$ and, substituting for A:

$Q_F = K_2/K_3 \, Q_D$.

The value of the signal $K_3$ can be arranged so that $K_2/K_3$ equals unity.

As indicated above the arrangements of FIGS. 1 and 2 are intended for operation at choked gas flow. It may, however, be the case that the gas supply pressure is insufficient to maintain choked flow through the metering orifice, in which case the flow equations are more complex. It is, however, desirable to retain a control arrangement adapted to choked flow conditions, so that the simpler calculations associated with choked flow may be performed. Where these calculations are carried out by digital equipment the choked flow calculations may be performed at a greater speed than those associated with unchoked flow.

It is an object of the system shown in FIGS. 3 to 5 to provide a flow control system for a fuel gas supply to an engine, wherein in the gas supply pressure may vary so as to result in either choked or unchoked flow through a metering orifice, and in which a regulating device for the gas supply, separately from the metering valve, is unnecessary.

As shown in FIG. 3, a gas turbine engine 50 is supplied with gaseous fuel whose flow is regulated by a metering arrangement 51. The metering arrangement 51 is located in a fuel supply passage 52.

The metering arrangement 51 is responsive to a control signal on a line 53 from an electronic control circuit 54, shown in more detail in FIG. 5. Control circuit 54 is responsive to a digital signal $Q_D$, corresponding to desired fuel flow, and supplied on a line 55 from a computer 56. The computer 56 is responsive to operating parameters of the engine 50, for example engine speed N and combustion temperature $T_C$, and also to a signal $\theta$ dependent on the setting of a power demand control for the engine 50.

A temperature-responsive device 57 is responsive to the temperature T of the gas in the passage 52 upstream of the metering arrangement 51 to supply, on a line 58, a signal proportional to $1/\sqrt{T}$.

A transducer 59 is responsive to the fuel pressure in the passage 52 upstream of the metering arrangement 51 to supply, on a line 60 a signal P proportional to this pressure. A further transducer 61 is responsive to the pressure difference across the metering arrangement 51 to supply, on a line 62 a signal $D_P$ proportional to this pressure difference. The electronic control circuit 54 is responsive to the aforesaid signals $1/\sqrt{T}$, P, $D_P$ on lines 58, 60, 62 respectively.

The metering arrangement 51 is shown in detail in FIG. 4 and includes a main hydraulically-operated flow control valve 70 having an axially-slidable control element 71. Control element 71 is movable by a double-acting piston 72. Piston 72 is urged in opposite directions by pressures applied to respective lines 73, 74, these pressures being controlled by an electro-hydraulic valve 75 which is responsive to the control signal on line 53 from the circuit 54. Hydraulic supply pressure and return lines 76, 77 communicate with the valve 75 and with a hydraulic pressure source 78, the lines 76, 77 being interconnected by a relief valve 79. A displacement transducer 80 is responsive to the position of the control element 71 to provide, on a line 81 a signal A proportional to the gas flow area of the main flow control valve 70. The signal A is also supplied to the electronic control circuit 54. Upstream of the main flow control valve 70 is a shut-off valve 82.

As already indicated in connection with FIGS. 1 and 2, for choked flow through a metering orifice:

$$\text{Mass flow } Q_F = K_2 A P / \sqrt{T} \tag{1}$$

For unchoked flow:

$$\text{Mass flow } Q_F = K_4 A \phi_2 \sqrt{P \cdot D_p} / \sqrt{T} \tag{2}$$

Where $K_4$ is a constant dependent on the characteristics of the gas and, $$\phi_2 = \sqrt{\left(\frac{2}{\gamma - 1}\right)\left(\left[\frac{P_B}{P}\right]^{\frac{2}{\gamma}} - \left[\frac{P_B}{P}\right]^{\frac{\gamma + 1}{\gamma}}\right)\left(\frac{\gamma}{2(1 - P_B/P)}\right)} \tag{3}$$

Where $P_B = P - D_p$.

The electronic control circuit 54 is operable to provide a control signal on line 53 which is a function of either mass flow equation (1) or (2) above, dependent on whether the flow through the main control valve 70 is choked or unchoked. The presence or otherwise of a choked flow condition is dependent on the function $D_p/P$, and the control circuit 54 is responsive, in a manner to be described, to the value of this function to select the manner in which the control signal on line 53 is calculated.

Control circuit 54 includes an analog to digital converter 90 which is responsive to the signal on line 58 to provide, on a line 91, a digital signal proportional to $1/\sqrt{T}$. Analog to digital converters 92, 93 are respectively responsive to the signals on lines 60, 62 to provide, on lines 94, 95 digital signals proportional to P and $D_P$.

A dividing circuit 96 is responsive to the signals on lines 94, 95 to provide, on a line 97, a signal proportional to $D_P/P$. A function generator 98 is responsive to the signals on line 97 to perform the calculation indicated at equation (3) above and to provide, on a line 99, a signal proportional to the value of $\phi_2$.

The signal on line 97 is also supplied to a discriminator circuit 100 which supplies an output signal on a line 101 when the value of $D_P/P$ is greater than or equal to .47, which corresponds to choked gas flow. A square root calculator 108 is also responsive to the signals on line 97 to provide, on a line 109, an output signal corresponding to $\sqrt{D_P/F}$.

A store 102 has two locations whose contents can be set to selected values of the constants $K_2$ and $K_4$ in equations (1) and (2) above. These values may be read out on respective lines 103, 104.

An analog to digital converter 105 is responsive to the signal on line 81 to provide, on a line 106 a digital signal corresponding to the flow area A of the main control valve 70.

A first multiplying circuit 110 is responsive to the signals on lines 91, 94, 103, 106 to supply, on a line 111 an output corresponding to $Q_F = K_2 A P/\sqrt{T}$. A second multiplying circuit 112 is responsive to the signals on lines 91, 94, 99, 104, 106 and 109 to provide, on a line 113, an output corresponding to $Q_F = K_4 A \phi_2 \sqrt{P \cdot D_P}/\sqrt{T}$.

A subtracting circuit 120 is responsive to the signals on lines 106, 111 to provide, on a line 121, a signal proportional to $Q_F - A$, for the choked flow condition. A further subtracting circuit 122 is responsive to the signals on lines 106, 113 to provide, on a line 123, a signal proportional to $Q_F - A$ for the unchoked flow condition. The reason for the subtraction of the A term will later be made apparent.

In the presence of a signal on line 101, corresponding to choked gas flow, a selector circuit 124 permits the signals on line 121 to pass to a digital to analog converter 125. In the absence of a signal on line 101 the unchoked control signals on line 123 pass to the digital to analog converter 125.

Output signals from the converter 125 are supplied to one input of a comparator 126. The digital signals on line 55, corresponding to desired fuel flow $Q_D$ are supplied via a digital to analog converter 127 to a second input of the comparator 126.

Operation of the electro-hydraulic valve 75 may be expected to be very rapid and to cause correspondingly rapid movement of the main flow control valve 70. Since as indicated, the greater part of the operations performed by the control circuit 54 are digital, those operations, together with analog to digital, or digital to analog conversion, may take up to 20 milliseconds to complete, during which time the control element 71 of the valve 70 may have moved appreciably. Accordingly therefore the valve position signal A on line 81 is supplied to the comparator circuit 126, to provide a feedback control. This feedback signal A is added to the selected $Q_F - A$ signal from the digital to analog converter 125 and the result compared with the $Q_D$ signal from the converter 127. The comparator circuit 126 is such that there is no output signal on the line 53 when the result of this latter comparison is zero, that is when $Q_F = Q_d$.

The system thus provides, in either choked flow or unchoked flow conditions, as appropriate, an actual fuel gas flow which corresponds to demanded gas flow, without the need for an additional gas pressure regulating valve.

I claim:

1. A gas flow control system comprising a variable flow metering device, means for generating a first signal which is a function of a desired gas flow through said device, means, responsive to the gas pressure upstream of said device and to the effective flow area of said device, for generating a second signal which is a function of a choked gas flow through the device, means, responsive to said upstream pressure and said flow area and also to a pressure differential across said device, for generating a third signal which is a function of an unchoked gas flow through the device, actuator means responsive to a difference between said first signal and either said second or third signals, for varying said effective flow area, and selector means, responsive to a predetermined level of the ratio of said pressure differential to said upstream pressure, for rendering said actuator means responsive either to said second or said third signal, whereby said actuator means can control said device in accordance with a difference between desired and actual gas flows either in an unchoked or a choked flow condition.

2. A system as claimed in claim 1 which includes means for generating a signal dependent on a temperature of said gas, said means for generating said second and third signals being dependent on said temperature-dependent signal.

3. A system as claimed in claim 1 or 2 which includes means for generating fourth and fifth signals which are dependent on a predetermined characteristics of the gas, said means for generating the second and third signals being respectively responsive to said fourth and fifth signals.

4. A system as claimed in claim 3 in which said means for generating the second and third signals comprise respective first and second multiplying circuits.

5. A system as claimed in claim 1 or 2 which includes means for generating a sixth signal proportional to quotient of said pressure differential divided by said upstream pressure, said means for generating the third signal and said selector means being responsive to said sixth signal.

6. A system as claimed in claim 5 which includes means responsive to said sixth signal for generating a function signal characteristic of an unchoked flow through said device, said means for generating the third signal being responsive to said function signal.

* * * * *